US009322926B2

(12) United States Patent
Sagiraju et al.

(10) Patent No.: US 9,322,926 B2
(45) Date of Patent: Apr. 26, 2016

(54) METHOD AND APPARATUS FOR SYNCHRONIZATION AND PRECISE TIME COMPUTATION FOR GNSS RECEIVERS

(75) Inventors: Phanikrishna Sagiraju, Cedar Rapids, IA (US); Steven Gronemeyer, Cedar Rapids, IA (US)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 725 days.

(21) Appl. No.: 13/436,781

(22) Filed: Mar. 30, 2012

(65) Prior Publication Data

US 2013/0257647 A1 Oct. 3, 2013

(51) Int. Cl.
*G01S 19/24* (2010.01)
*G01S 19/42* (2010.01)

(52) U.S. Cl.
CPC .............. *G01S 19/42* (2013.01); *G01S 19/246* (2013.01)

(58) Field of Classification Search
CPC ....... G01S 19/30; G01S 19/29; G01S 19/252; G01S 19/26
USPC ............................ 342/357.63, 357.64, 357.67
See application file for complete search history.

(56) References Cited

U.S. PATENT DOCUMENTS

| 5,323,322 | A | 6/1994 | Mueller et al. | |
|---|---|---|---|---|
| 7,924,220 | B1 | 4/2011 | Lennen et al. | |
| 2003/0201934 | A1* | 10/2003 | Asher | G01S 19/21 342/357.23 |
| 2004/0092228 | A1* | 5/2004 | Force | H04B 7/18523 455/19 |
| 2005/0200347 | A1* | 9/2005 | Agoston | G01R 31/2841 324/76.15 |
| 2009/0041104 | A1* | 2/2009 | Bogdan | H03K 5/15013 375/226 |
| 2009/0213906 | A1* | 8/2009 | Schmid | G01S 19/24 375/147 |
| 2009/0262014 | A1* | 10/2009 | DiEsposti | G01S 19/05 342/357.42 |
| 2010/0045508 | A1* | 2/2010 | Ekbal | G01S 13/765 342/145 |
| 2010/0135367 | A1* | 6/2010 | Schmid | H03J 7/04 375/150 |
| 2011/0007783 | A1* | 1/2011 | Weill | G01S 19/254 375/150 |
| 2012/0026037 | A1* | 2/2012 | Thomson | G01S 19/215 342/357.43 |

FOREIGN PATENT DOCUMENTS

| EP | 1843168 | 10/2007 |
|---|---|---|
| EP | 1884842 | 2/2008 |

(Continued)

OTHER PUBLICATIONS

Frank Stephen Tromp Van Diggelen, A-GPS:Assisted GPS, GNSS and SBAS, 2009, Artech House, p. 56-59, 82, 166-167 and 201.*

(Continued)

*Primary Examiner* — Harry Liu
(74) *Attorney, Agent, or Firm* — The Marbury Law Group, PLLC

(57) ABSTRACT

According to certain aspects, the invention includes using acquisition channel results from a number of satellites to achieve composite weak acquisition. According to certain other aspects, the invention also includes solving for an improved position estimate and, with a sufficiently accurate, either initial or improved position estimate, also solving for GPS system time using a composite of acquired signals from a plurality of satellites. Within commonly experienced initial position and time uncertainties, the geometric range changes are fairly linear, which allows the point of convergence of ranges to solve for GPS position and subsequently for time with reasonable accuracy, which is the equivalent to obtaining frame sync without any data demodulation or preamble matching.

18 Claims, 12 Drawing Sheets

(56) References Cited

FOREIGN PATENT DOCUMENTS

| EP | 2081091 | 7/2009 |
|---|---|---|
| GB | 2493200 | 1/2013 |
| JP | 2007-121066 | 5/2007 |
| WO | 95/18977 | 7/1995 |
| WO | 2004/095055 | 11/2004 |

OTHER PUBLICATIONS

Axelrad, P., "Enhancing GNSS Acquisition by Combining Signals from Multiple Channels and Satellites", 22nd Int'l. Mtg. Sat. Div. of Institute of Navigation 2009 pp. 2617-2628.

Bradley, B.K., "Peformance Analysis of Collective Detection of Weak GPS Signals", 23rd Int'l. Tech. Mtg. Sat. Div. of Institute of Navigation, 2010 pp. 3041-3053.

* cited by examiner

METHOD AND APPARATUS FOR SYNCHRONIZATION AND PRECISE TIME COMPUTATION FOR GNSS RECEIVERS

FIELD OF THE INVENTION

In general, the present invention relates to obtaining navigation solutions using signals processed by GNSS receivers, and more particularly to achieving synchronization and precise time computation, which is equivalent to achieving frame synchronization, using code offsets from a plurality of acquisition or track channels rather than through data demodulation or preamble matching.

BACKGROUND OF THE INVENTION

With the development of radio and space technologies, several satellite-based navigation systems (i.e. satellite positioning system or "SPS") have already been built and more will be in use in the near future. Those systems with full global coverage are sometimes referred to as Global Navigation Satellite Systems ("GNSS"). SPS receivers, such as, for example, receivers using the Global Positioning System ("GPS"), also known as NAVSTAR, have become commonplace. Other examples of SPS and/or GNSS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS"), any future Western European SPS such as the proposed "Galileo" program, or any other existing or future system such as the Chinese "Beidou" or "Compass" system. As an example, the U.S. NAVSTAR GPS system is described in GPS Theory and Practice, Fifth ed., revised edition by Hofmann-Wellenhof, Lichtenegger and Collins, Springer-Verlag Wien NewYork, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

In environments where satellite signals are degraded, however, a GPS receiver often encounters problems in locking onto the signals that are needed for the calculation of position, velocity, altitude, and time. In a degraded signal environment, satellite signals can be weak or otherwise difficult for GPS receivers to lock on to. One example of a degraded signal environment is a tunnel through which a car equipped with a GPS receiver is driving. While the GPS receiver is in the tunnel, the satellite signals are completely obstructed and no lock can be acquired. As a result, the GPS receiver cannot accurately calculate its position and other navigational data (such as velocity, altitude, and time) while the car is in the tunnel. In addition, because GPS receivers typically utilize positioning algorithms that use navigational filters that account for the GPS receivers' last-known positions, the GPS receiver's position calculation when the car emerges from the tunnel can also be less accurate since accurate position calculations were not performed during the time that the car was in the tunnel.

Degraded signal environments are often encountered in urban areas, such as cities with many tall buildings. A city with many tall buildings can contain "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas. Other degraded environments include tunnels, garages, and inside buildings.

Data bit synchronization and frame synchronization in weak signal environments have been achieved using combined data from several satellites as described in co-pending application Ser. No. 12/276,987 and U.S. Pat. No. 7,924,220. These techniques use data bit stripping based on known or assumed data bit values. Further techniques for collective processing of multiple GPS signals are discussed in B. Bradley et al., "Performance Analysis of Collective Detection of Weak GPS Signals," 23$^{rd}$ International Technical Meeting of the Satellite Division of the Institute of Navigation, Sep. 21-24, 2010, pp. 3041-3053 and P. Axelrad et al., "Enhancing GNSS Acquisition by Combining Signals from Multiple Channels and Satellites," 22nd International Meeting of the Satellite Division of the Institute of Navigation, Sep. 22-25, 2009, pp. 2617-2628. Nevertheless, certain challenges remain that require different and/or additional novel approaches.

SUMMARY OF THE INVENTION

According to certain aspects, the invention includes using acquisition channel results from a number of satellites to achieve composite weak acquisition. According to certain other aspects, the invention also includes solving for an improved position estimate and, with a sufficiently accurate, either initial or improved position estimate, also solving for GPS system time using a composite of acquired signals from a plurality of satellites. Within commonly experienced initial position and time uncertainties, the geometric range changes are fairly linear, which allows the point of convergence of ranges to solve for GPS position and subsequently for time with reasonable accuracy, which is the equivalent to obtaining frame sync without any data demodulation or preamble matching.

In furtherance of these and other aspects, a method according to embodiments of the invention includes identifying correlation peaks in a plurality of acquisition channels for a corresponding plurality of satellites; performing a position domain search to determine a position where ranges to all of satellites converge; and adjusting the resulting code offsets based on the determined position, wherein the remaining position error can be reduced to near zero while simultaneously resolving the GPS time ambiguity, thereby obtaining precise GPS time which is equivalent to declaring frame synchronization.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
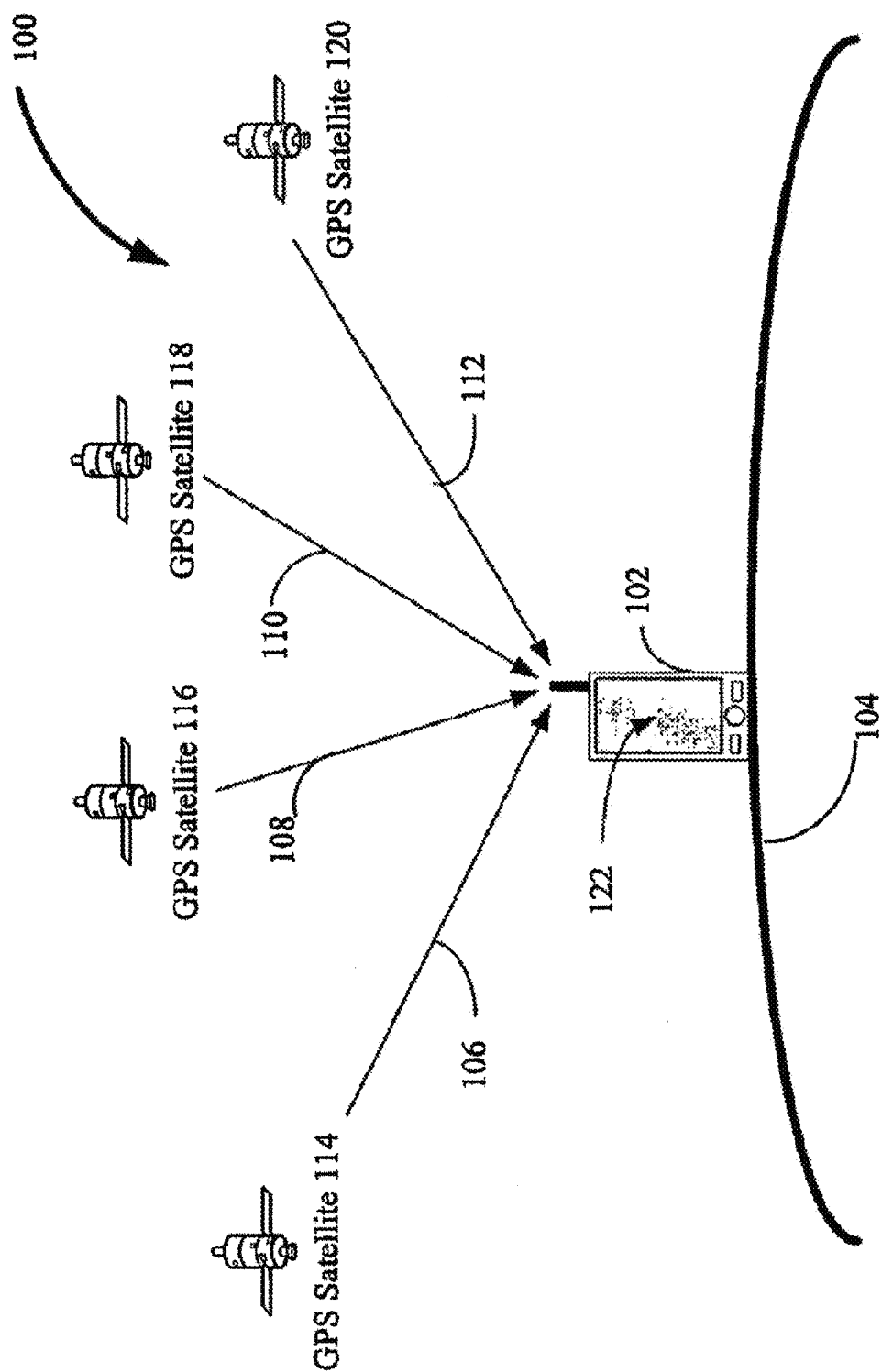
FIG. 1 is a block diagram illustrating an example implementation of embodiments of the invention.

FIG. 1 illustrates an example implementation of embodiments of the invention. As shown in FIG. 1, an example GNSS system 100 includes GPS satellites (i.e. satellite vehicles or SVs) 114, 116, 118 and 120 that broadcast signals 106, 108, 110 and 112, respectively, that are received by receiver 122 in handset 102, which is located at a user position somewhere relatively near the surface 104 of earth.

Handset 102 can be a cellular or other type of telephone with built-in GPS functionality (e.g. iPhone, Blackberry, Android smartphone, etc.), or it can be a notebook or tablet computer (e.g. iPad, Galaxy, etc.) with similar built-in positioning functionality, or it can be a personal navigation device (PND, e.g. from Garmin, TomTom, etc.) or any GPS device embedded in tracking applications (e.g. automotive tracking from Trimble, package or fleet management tracking from FedEx, child locator tracking applications etc.).

Receiver 122 can be implemented using any combination of hardware and/or software, including GPS chipsets such as SiRFstarIII GSD3tw, SiRFstar IV GSD4t or SiRFstar V from CSR Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the weak acquisition improvement techniques of the present invention after being taught by the present specification.

Signals 106, 108, 110 and 112 are well-known GPS signals in which three binary codes shift the satellite's transmitted L1 and/or L2 frequency carrier phase. Of particular interest, the C/A Code (Coarse Acquisition) modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 chips (one millisecond). There is a different C/A code PRN for each SV. GPS satellites are often identified by their PRN number, the unique identifier for each pseudo-random-noise code. The C/A code that modulates the L1 carrier is the basis for the civil uses of GPS.

Receiver 122 produces the C/A code sequence for a specific SV with some form of a C/A code generator. Modern receivers usually store a complete set of pre-computed C/A code chips in memory, but a hardware shift register implementation can also be used. The C/A code generator produces a different 1023 chip sequence for each phase tap setting. In a shift register implementation the code chips are shifted in time by slewing the clock that controls the shift registers. In a memory lookup scheme the required code chips are retrieved from memory. The C/A code generator repeats the same 1023-chip PRN-code sequence every millisecond. PRN codes are defined for up to 1023 satellite identification numbers (37 are defined for satellite constellation use in the ICD but system modernization may use more). The receiver slides a replica of the code in time until there is correlation with the SV code.

As is known, signals from at least four SVs are usually needed before receiver 122 can provide a 3-dimensional navigation solution (only three satellites are required for a 2-dimensional navigation solution, e.g. by using known height}. Accordingly, receiver 122 typically enters a conventional sequence to acquire and extract the required data from each of signals 106, 108, 110 and 112. In a first step, typically called acquisition, receiver 122 acquires signals 106, 108, 110 and 112 by correlating the unique C/A code corresponding to SVs 114, 116, 118 and 120 with received RF energy at the antenna of handset 102 and determining that these received signals have sufficient strength (e.g. carrier to noise density ratio C/N0) to use in subsequent processing. In a next step, typically called track, the receiver 122 locks onto the C/A code for each acquired SV, which repeats every 1 msec. In a next step typically called bit sync, receiver 122 synchronizes to the data bit in each signal 106, 108, 110 and 112, which occurs once over 20 msec. Then in a final step where the precise GPS time is computed, typically called frame sync, receiver 122 determines the frame boundary of the received data bits in signals 106, 108, 110 and 112. At this point navigation can begin, for example by trilateration techniques and using PVT filters and algorithms known to those skilled in the art.

It should be noted that frame synchronization is omitted (and sometimes also bit sync) in some applications such as sync free nav (although bit synchronization is still desired for optimal operation as tracking loops need to integrate across an exact data bit to maximize signal energy applied to tracking). Moreover, various improved methods can be used to perform data bit synchronization and frame synchronization that are different from conventional methods, such as those described in co-pending application Ser. No. 12/276,987 and U.S. Pat. No. 7,924,220, the contents of both being incorporated by reference herein. However, details thereof will be omitted here for sake of clarity of the invention.

A conventional frame sync process processes each SV being tracked separately and typically needs at least two complete subframes (i.e. at least two multiples of 6 seconds) to find the repeating 8-bit preamble that begins each subframe, and even longer in weak signal levels (e.g. 20 dB-Hz or 15 db-Hz or lower).

The present inventors recognize that the need for accurate location assistance during situations (e.g. city driving, indoors) where signal levels are very weak (e.g. as low as −165 dBm) is an especially acute need.

In general, the invention provides a method and apparatus for using acquisition channel results from a number of satellites to achieve composite weak acquisition. According to certain other aspects, the invention also provides a method and apparatus for solving for GPS time using a composite of acquired signals from a plurality of satellites, when both the user position and satellite position are known. In the search space available and the time uncertainty to be searched, the geometric ranges are fairly linear, which allows the point of convergence of ranges to solve for GPS time with reasonable accuracy, which is the equivalent to obtaining frame sync.

According to certain aspects, the present inventors recognize that the concept of cross satellite detection for performing acquisition has been used before in applications such as a micro power mode. Some of the assumptions used to perform cross satellite acquisitions in these cases are: user is nearly static, can predict GPS time to within +/−125 usec, can predict TCXO frequency to within +/−30 ppb, can predict code phase to within +/−1 chip and can predict Doppler to within +/−3 Hz. So the cross satellite detection used in micro power mode cannot be used if the user is moving too rapidly.

The present inventors have further recognized that concepts of both cross satellite and position domain search can be combined in new and unexpected ways into a composite weak acquisition technique which is capable of performing acquisition down to ~12 dBHz with coarse aided information as available for 3GPP (2 second time uncertainty, 3 km position uncertainty and 0.2 ppm of frequency uncertainty).

Certain general aspects of the invention will now be described in connection with the drawings, beginning with FIG. 2.

Figure 2:
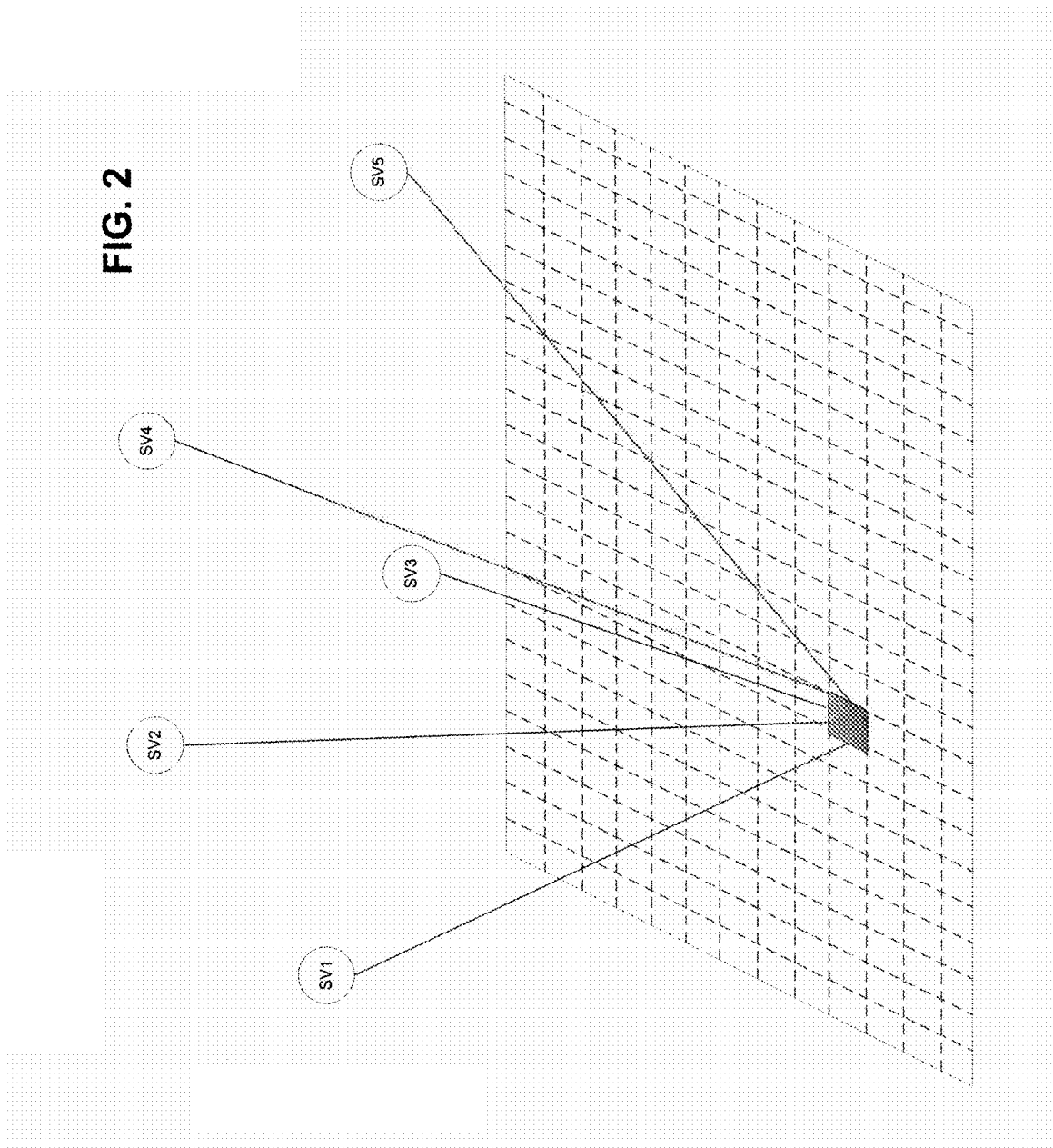
FIG. 2 is a block diagram illustrating concepts of composite weak acquisition according to embodiments of the invention.

FIG. 2 illustrates a first step that is referred to generally as composite weak acquisition. In this step, the position domain is searched assuming fixed satellite locations, to see where all the ranges converge. This yields a coarse user location to within one chip or +/−150 m. More particularly, FIG. 2 shows an example where a receiver has acquired signals from five satellites, SV1, SV2, SV3, SV4 and SV5 (typically signals from at least four satellites are required for a three-dimensional position, and three satellites for a two-dimensional position).

Figure 3:
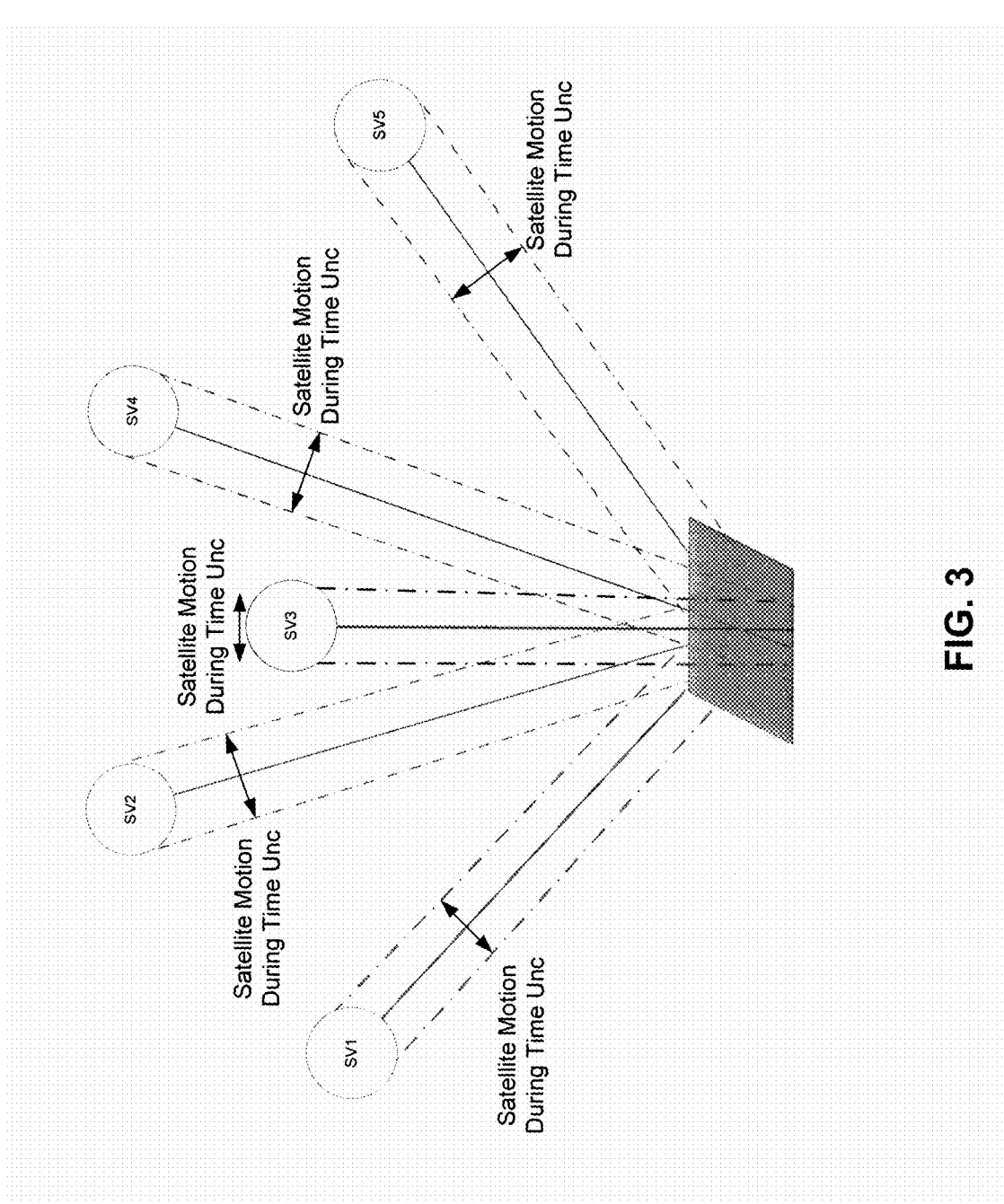
FIG. 3 is a block diagram illustrating concepts of computing precise time according to embodiments of the invention.

FIG. 3 illustrates a next step which is referred to generally as frame sync/computing precise time. In this step, the satellites are being tracked and the bit edge is known, so the ranges to the satellites are also known. It is assumed that the satellite path during the time uncertainty of +/−two seconds is linear. The satellite motion is accounted for by adjusting the ranges using the range rates. The ranges are adjusted using the satellite range rates with 20 ms time increments to see at what time all the ranges converge. The point of convergence is the true user location and similarly the time at which all the ranges converge is the true GPS time. Knowing the true GPS time is the equivalent to having frame sync.

Figure 4B:
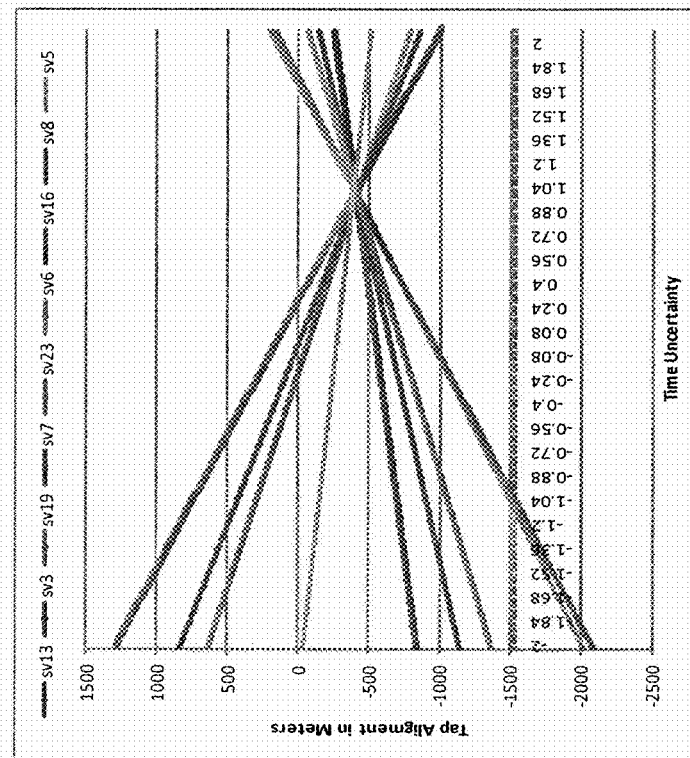
FIGS. 4A and 4B are graphs illustrating aspects of computing precise time/achieving frame synchronization using multiple satellite signals according to embodiments of the invention.
Figure 4:
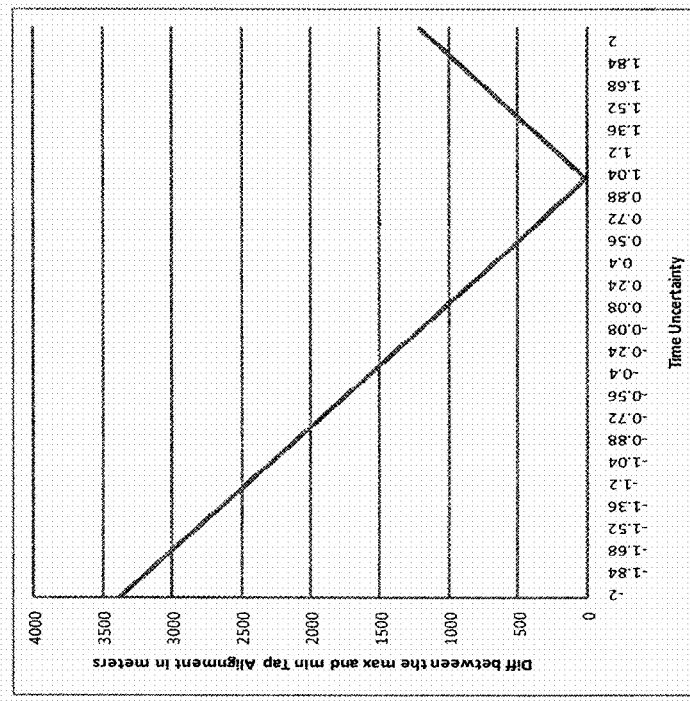

FIGS. 4A and 4B are two different ways of illustrating the same method for solving for time convergence. FIG. 4A illustrates the point of convergence by actually showing the adjusted SV tap alignment in meters due to satellite motion in the given time uncertainty of +/−two second using the range rates. The point of intersection of the lines is the point of convergence. FIG. 4B illustrates finding the point of convergence by taking the difference between maximum and minimum tap alignment values. In either example, the time needs to be corrected by 1.02 seconds. It should be noted that the solving of time or finding a point of convergence is not limited to the illustrated method, and details of other methods are omitted here for sake of clarity of the invention.

Example implementations of the invention in accordance with certain of the above general aspects will now be described in more detail.

Figure 5:
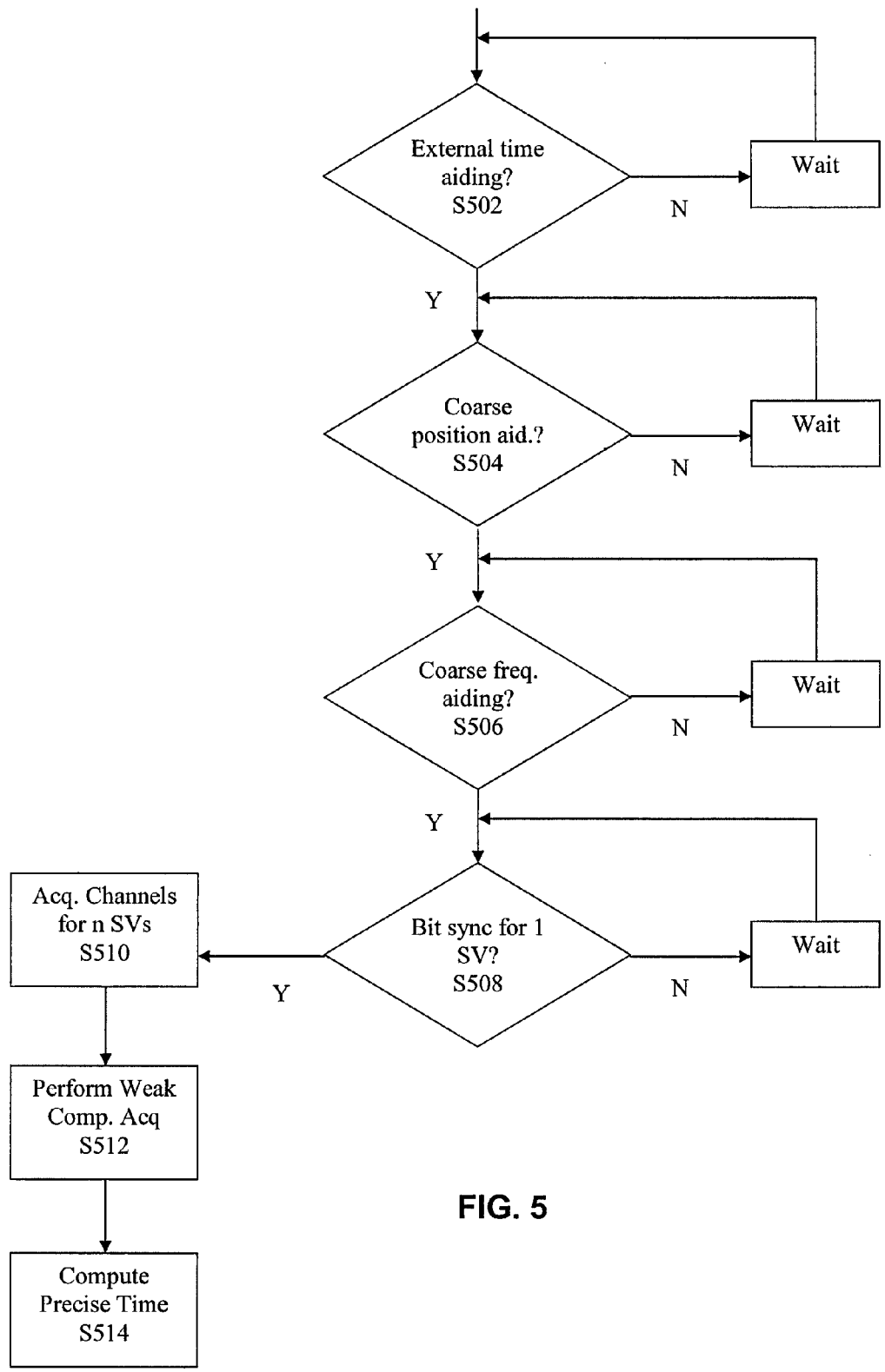
FIG. 5 is a flowchart of an example method of obtaining acquisition and computing precise time/achieving frame sync using multiple satellite signals according to embodiments of the invention.

As shown in the example implementation shown in FIG. 5, a number of steps are preferably performed prior to performing composite weak acquisition according to embodiments of the invention. In order to set up the right acquisition channel types, the time, position and frequency aiding uncertainties must be known from either internal or external sources. The aiding can be obtained in any order, and so the order provided herein is only one possible example. In step S502, the method waits until external/internal Time Aiding is obtained to within +/−2 seconds. For example, with RTC time-temperature calibration using a temperature sensor, 2 second time uncertainty can be maintained for a long time, such as many hours or days. According to certain aspects, if the time aiding is coarse, bit sync on one of the SVs is needed so that the code phase uncertainty is solely dependent on the position aiding. In a next step S504, the method waits until Coarse Position Aiding of less than +/−3 km is obtained, which is true in most standardized coarse aided test cases. In example embodiments, the channel size is +/−64 chips with ¼ chip spacing making the 512 tap channel. The amount of position uncertainty which a channel can cover using +/−64 chips is thus +/−18 km, which is more than what a normal coarse aiding position would be.

In a next step S506, the method waits until internal or external Coarse Frequency Aiding of less than 0.2 ppm is obtained. As an example, if the TCXO/XO/DSXO has frequency-temperature calibration with a temperature sensor, internal aiding may suffice. In example embodiments such as that shown in FIG. 5, if frequency uncertainty is greater than 0.2 ppm then it will not be possible to search all the SV's in the first pass (will not have sufficient channels to cover all the code and frequency for all the SV's) which will result in eventual failure. If the uncertainties are large and all the SV's cannot be searched in the first pass, the SV's that are found are transitioned to track state. In a next step S508, the method waits until bit synchronization is obtained for at least one SV. One reason for including this step in embodiments of the invention is that when bit edge is known then sub 20 ms uncertainties are zero and the primary contribution to the sub 1 ms uncertainties are from position uncertainty. When at least four track measurements are available, of which at least one is bit synced, they can be used as the input to composite processing instead of using acquisition data.

In step S510, after all the initial steps S502 to S508 have been confirmed, acquisition reports are established for signals from a plurality n of SV's. Preferably, reports from at least four channels are used (i.e. n=4). For example, initial results from all acquisition channels having a threshold amount of signal strength or having completed the maximum integration time are considered and ranked according to SNR.

Next, in step S512, composite weak acquisition is performed, as described in more detail below. A failure to achieve the required levels of initial position, time and frequency uncertainty, or enough measurements from either acquisition and/or track, would prevent composite weak acquisition.

After weak composite acquisition is achieved, in step S514, frame synchronization is obtained by computing precise GPS time, as further described in more detail below.

Example implementations of performing composite weak acquisition such as that performed in step S512 in accordance with aspects of the invention will now be described. The concept of cross satellite detection when the position is not known accurately will be described below in connection with FIGS. 6(a) and 6(b), which diagrammatically illustrate aspects of example processes of composite weak acquisition according to the invention.

Figure 6:
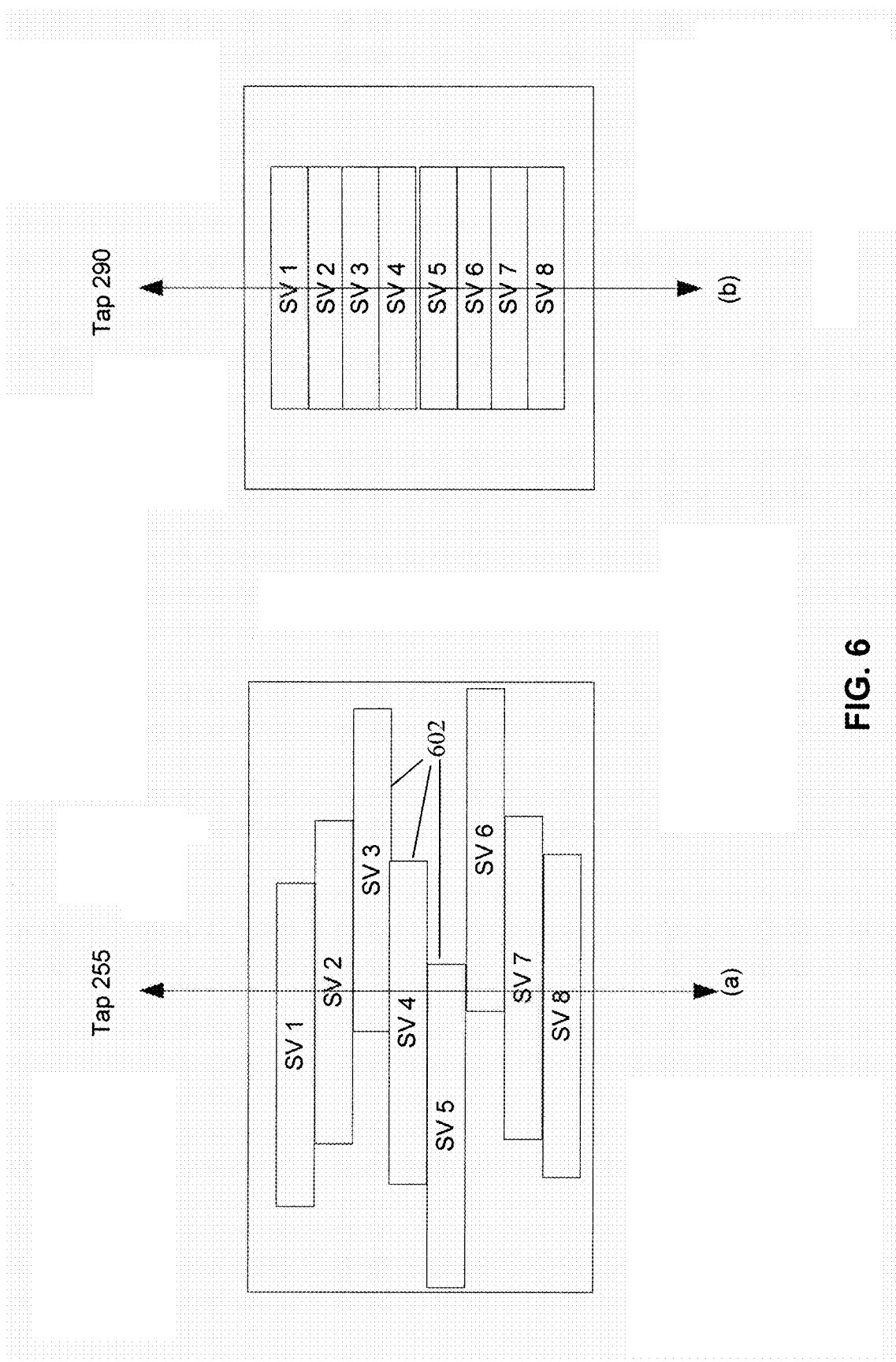
FIGS. 6A and 6B are diagrams illustrating an example process of obtaining weak composite acquisition according to the invention.

As illustrated in FIG. 6(a), when the position is not accurately known, the correlation peaks in the acquisition channels for the SVs are significantly offset with respect to the correlation tap where the peak would have been expected had the position estimate been the true position. More particularly, FIG. 6(a) diagrammatically illustrates receiver acquisition channels 602 for eight different satellites SV1 to SV8. In this example, each channel covers +/−64 chips with ¼ chip spacing making a 512 tap channel. The amount of position uncertainty which a channel can cover using +/−64 chips is +/−18 km, which is more than the margin required for a normal coarse aiding position.

With a perfect position estimate, all the channels 602 have their true peaks at a common code tap. FIG. 6(a) illustrates that without perfect time and position estimate, the center tap of each channel is offset in code phase from a hypothetical common center tap 255, which corresponds to zero position and time error.

With proper adjustment to the position, channels 602 all line up at the same code phase tap as shown in FIG. 6(b). FIG. 6(b) shows the channels lining up at an example tap 290 to illustrate aspects of composite weak acquisition according to the invention, which adjusts the estimated position, causing the channels to line up at a common tap other than 255 (which is the center tap when neither time nor position correction needs to be made).

To further illustrate the weak composite acquisition technique of the present invention, the following is an example set of real data collected from a GPS receiver having acquisition channels as described above. In this example, data from the channels corresponding to the nine SVs with the eight highest 16 bit correlation peak values and their corresponding code tap values are shown. For each satellite, the azimuth and elevation values based on the initial estimate of position (internal/external position and ephemeris aiding) are shown below in degrees (i.e. "AzEl(x)" where x is the channel number associated with the satellite), as well as the top eight peak 16-bit correlation peak values (i.e. "pks(x)") and their corresponding code taps (i.e. "taps(x)") within the 512 tap channel. The redundant tap numbers are due to multiple frequency bins. As can be seen, the taps with the peak values are all very different from each other. In the example shown in the data below, after adjustment they are lined up around tap 290, as also depicted in FIG. 6(b).

AzEl(13,:)=[310, 53];
taps(13,:)=[263, 263, 262, 261, 261, 261, 262, 262];
pks(13,:)=[15469, 15801, 16199, 16398, 18521, 18786, 19648, 20179];
AzEl(6,:)=[116, 40];
taps(6,:)=[314, 312, 314, 314, 313, 312, 313, 313];
pks(6,:)=[13662, 13993, 14126, 14358, 14557, 14657, 16315, 16481];
AzEl(3,:)=[138, 39];
taps(3,:)=[158, 47, 330, 328, 330, 329, 329, 329];
pks(3,:)=[13262, 13312, 13357, 13589, 13622, 14054, 14684, 15447];
AzEl(20,:)=[214, 18];
taps(20,:)=[141, 125, 420, 233, 66, 336, 47, 66];
pks(20,:)=[13183, 13249, 13270, 13303, 13316, 13403, 13415, 13581];
AzEl(7,:)=[282, 18];
taps(7,:)=[187, 314, 274, 276, 275, 275, 276, 276];
pks(7,:)=[13239, 13508, 13542, 13641, 13674, 14669, 14736, 14835];
AzEl(19,:)=[160, 15];
taps(19,:)=[54, 369, 305, 153, 351, 350, 173, 350];
pks(19,:)=[13224, 13258, 13285, 13318, 13390, 13457, 13484, 13689];
AzEl(32,:)=[192, 10];
taps(32,:)=[51, 257, 50, 154, 307, 339, 446, 446];
pks(32,:)=[13150, 13150, 13166, 13204, 13204, 13303, 13535, 13768];
AzEl(23,:)=[206, 80];
taps(23,:)=[297, 296, 296, 298, 298, 297, 297, 297];
pks(23,:)=[13117, 14117, 15117, 16117, 17117, 18117, 19117, 20117];
AzEl(30,:)=[50, 40];
taps(30,:)=[255, 254, 254, 256, 256, 255, 255, 255];
pks(30,:)=[13117, 14117, 15117, 16117, 17117, 18117, 19117, 20117];

As a result of weak composite acquisition according to aspects of the invention, the amount of code phase correction or adjustment to be made for each SV is determined. In general, this adjustment relates to pseudorange for the SV, as given by the formula below:

$$-\rho = -\cos(Az)*\cos(El)*\Delta N - \sin(Az)*\cos(El)*\Delta E$$

Where $\rho$ is pseudorange change to the satellite for which code phase is to be adjusted, Az and El are azimuth and elevation of the satellite and $\Delta N$ and $\Delta E$ are the delta north and delta east search points on a grid point centered around the true location, as determined by weak composite acquisition.

Two example methods for determining the amount by which the code phases are adjusted in accordance with composite weak acquisition embodiments of the invention will be described below. Those skilled in the art will appreciate further possible embodiments and alternatives after being taught by these examples.

Figure 7:
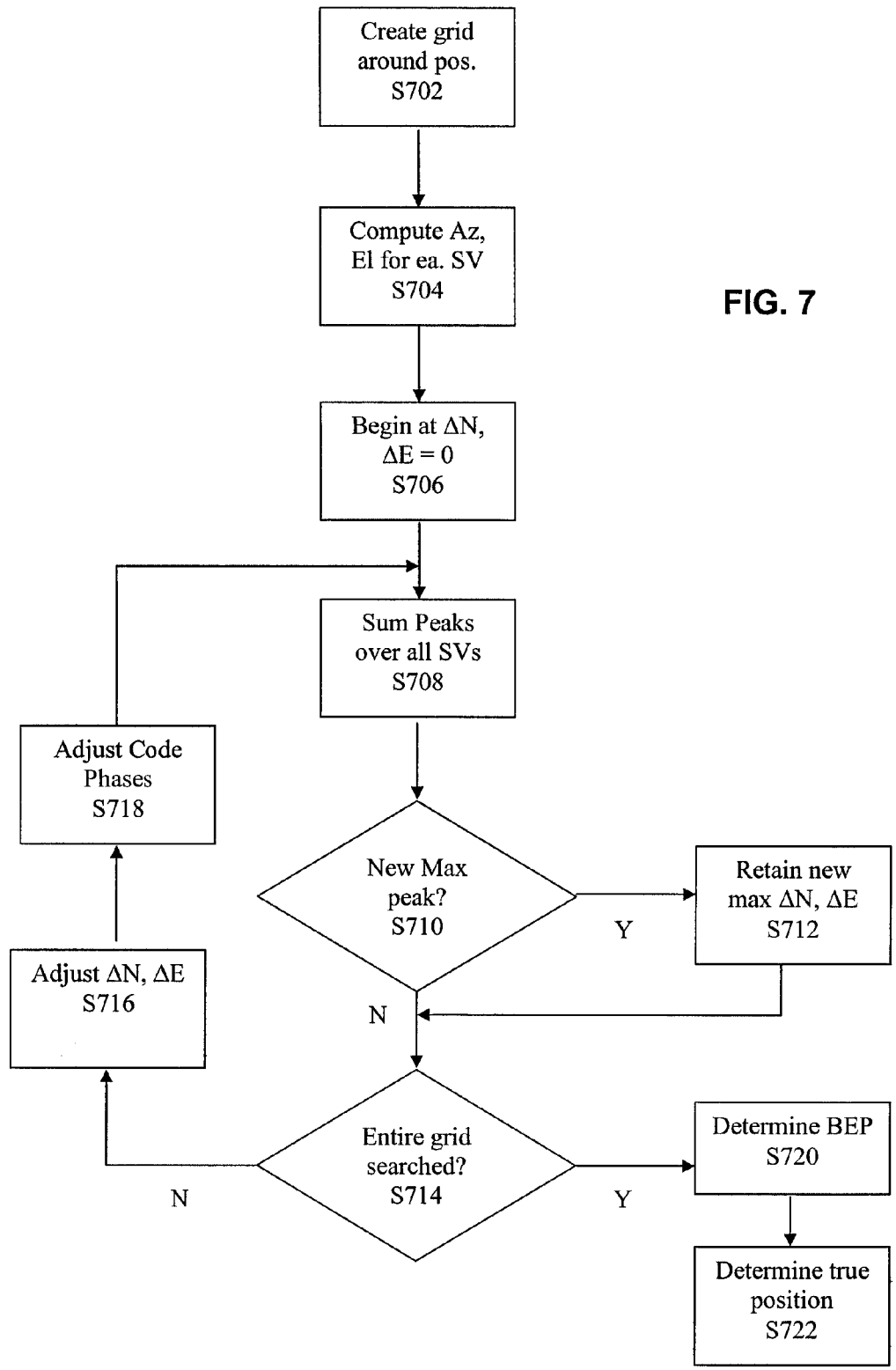
FIG. 7 is a flowchart illustrating an example method of obtaining weak composite acquisition according to embodiments of the invention.

A first example method is referred to herein as "Position Domain Search". In this example method, a position grid search is performed by covering the entire area of uncertainty, and the grid point with the maximum combined correlation peak determined during the search is used to pin point the location. Satellite positions and GPS time are held fixed at the nominal time estimate for this phase of the search. For example, as shown in FIG. 7, the process begins in step S702 by creating a grid in north and east directions from the estimated initial position with $\Delta N$ and $\Delta E$ grid points. As an example, the estimated position is obtained by external aiding. In this and other examples, the search is performed with each $\Delta N$ and $\Delta E$ grid point separated by 2 chip wide spacing, i.e. 586.5 m. In step S704, the Az and El is computed at the estimated position for each satellite for which data is collected. For example, with normal coarse aiding accuracy, the Az and El can remain constant based on the nominal values of initial position and time estimates, since the amount of change over these uncertainties is sufficiently small.

The search is started in step S706 by assuming $\Delta N$ and $\Delta E$ are both zero. This will be the unknown true position where the receiver collected the signals, i.e. the true user location. At this position the code phase taps and their corresponding correlation peak reports for all the SV's are given by the original acquisition reports. In the example of actual data provided above, these include the top eight code tap positions (i.e. "taps(x)") and the corresponding correlation peak values (i.e. "pks(x)") associated with the same. Those are the values at $\Delta N=0$ and $\Delta E=0$. The peak values from multiple SV's falling in the same code tap window, if any, are summed together in step S708. A code tap window is a sliding window that includes a small number of adjacent taps depending on the amount of adjustment made in the $\Delta N$ and $\Delta E$ grid points. In the given example, $\Delta N$ and $\Delta E$ are adjusted by 586.5 m, which is equivalent to 2 chips or eight code taps. In step S710, the current sum is compared to the current maximum peak value sum, and if it is a new maximum it is retained in step S712, along with the corresponding $\Delta N$ and $\Delta E$ values.

Next in step S714, it is determined whether the entire grid area has been searched. If the grid area has not been fully searched as determined in step S714, in step S716, the search continues by adjusting one of $\Delta N$ and $\Delta E$ by 586.5 m in either direction. In step S718, the code phases at that delta location are adjusted based on the satellite Azimuth and Elevation using the formula below:

$$-\rho = -\cos(Az)*\cos(El)*\Delta N - \sin(Az)*\cos(El)*\Delta E$$

where $\rho$ is the pseudorange change to a particular SV for a given change in position $\Delta N$ and $\Delta E$.

More particularly, for a given $\Delta N$ and $\Delta E$, as an example +586.5 m N and +586.5 m E, the value of $\rho$ is computed for a particular SV using the particular SV's azimuth (Az) and elevation (El) input into the formula above. The original code tap value for the SV is converted to meters and then is adjusted by the computed value of $\rho$ in meters. The new code tap value for the SV at the new $\Delta N$ and $\Delta E$ location is then derived by converting the adjusted value in meters into code tap units.

The process resumes in step S708 as described above until the entire search area is searched.

When the entire grid area has been searched, the highest saved sum peak value over the entire area is determined and the $\Delta N$ and $\Delta E$ associated with this highest sum peak value is determined to be the Best Estimate of Position (BEP) location in step S720. Now a reference location which is the BEP location is known. Accordingly, in step S722, the true location will be determined by adjusting the BEP location by $\Delta N$, $\Delta E$ to adjust the position back to the true receiver location. In other words, the initial estimate of position from aiding is adjusted by negative $\Delta N$ and negative $\Delta E$ to find the user's true position.

Figure 8:
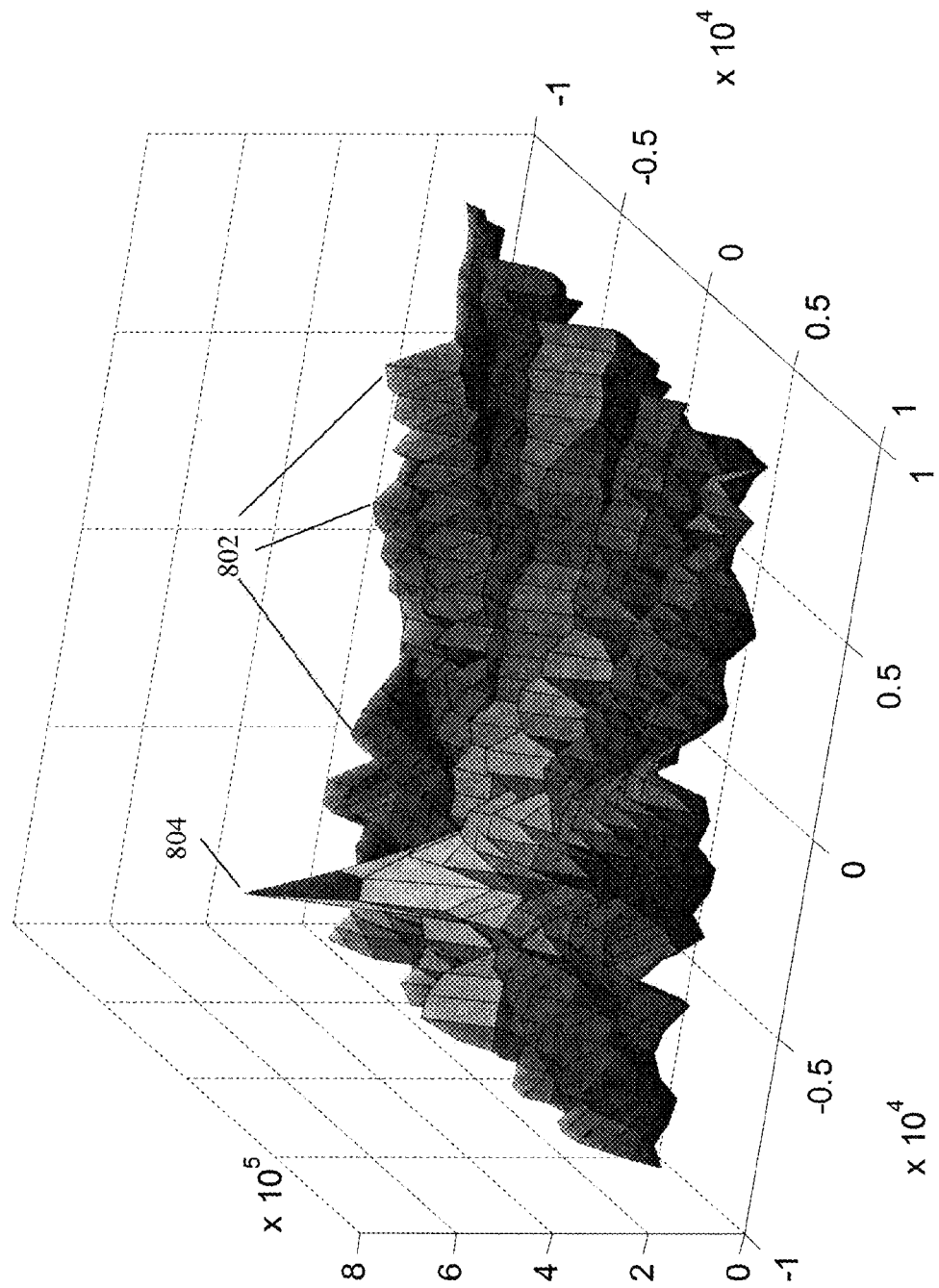
FIG. 8 is a diagram that graphically illustrates the method described in connection with FIG. 7.

FIG. 8 graphically illustrates one example of how the method described in connection with FIG. 7 works. In this example, the x and y directions of the 3-dimensional graph correspond to the given position search window offset from the true position. The center of the position search in the x-y domain is the unknown true position. The peaks 802 in the z direction of FIG. 8 correspond to the summed peaks at each grid point in the search. The tallest peak 804 corresponds to the initial position estimate from aiding, as determined above. As can be seen, the x-y position of this peak 804 is offset from the center of the grid due to the error in the initial estimate of the position.

Figure 9:
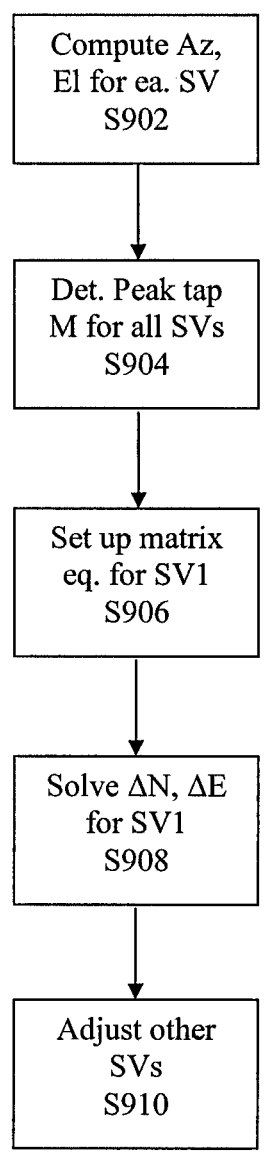
FIG. 9 is a flowchart illustrating another example method of obtaining weak composite acquisition according to embodiments of the invention.

A second equivalent method for determining how to adjust the code phases is referred to herein as "Solving for the point of intersection of lines". In the example flowchart shown in FIG. 9, the process starts in step S902 by computing the Az and El at the estimated position for each satellite at the time data is collected. For example, similarly to the method above, Az and El are computed based on the initial estimates for position and time using available ephemeris data or almanac data (almanac can typically be used if the almanac is no more than one week old). Moreover, similarly to the method above, the estimated position is obtained by external aiding, for example.

Next, it is noted that when there are n SV's $SV_1$ to SVn, their associated pseduorange changes are given by:

$$-\rho_1 = -\cos(Az_1)*\cos(El_1)*\Delta N - \sin(Az_1)*\cos(El_1)*\Delta E$$
$$-\rho_2 = -\cos(Az_2)*\cos(El_2)*\Delta N - \sin(Az_2)*\cos(El_2)*\Delta E$$
$$\vdots$$
$$-\rho_n = -\cos(Az_n)*\cos(El_n)*\Delta N - \sin(Az_n)*\cos(El_n)*\Delta E$$

where, for $SV_i$, $\rho_i$=pseudorange change and $Az_i$=azimuth, $El_i$=elevation as computed above in step S902.

The present inventors further note that, for some common location to be determined, all the code phases line up at a common tap. The values of $\Delta E$ and $\Delta N$ in the above equation are thus the position offsets from the true location to the initial estimated location.

Next, the method in step S904 determines, for each SVi, the measured code phases $M_i$ where the peak tap value is found. The present inventors further recognize that:

$$M_1 - \rho_1 = M_1 - \cos(Az_1)*\cos(El_1)*\Delta N - \sin(Az_1)*\cos(El_1)*\Delta E$$
$$M_2 - \rho_2 = M_2 - \cos(Az_2)*\cos(El_2)*\Delta N - \sin(Az_2)*\cos(El_2)*\Delta E$$
$$\vdots$$
$$M_n - \rho_n = M_n - \cos(Az_n)*\cos(El_n)*\Delta N - \sin(Az_n)*\cos(El_n)*\Delta E$$

Let $\cos(Az_1)*\cos(El_1)$ be $A_1$ and $\sin(Az_1)*\cos(El_1)$ be $B_1$. Similarly, let $\cos(Az_2)*\cos(El_2)$ be $A_2$ and $\sin(Az_2)*\cos(El_2)$ be $B_2$, and so on. This yields:

$$M_1 - \rho_1 = M_1 - A_1 \Delta N - B_1 \Delta E$$
$$M_2 - \rho_2 = M_2 - A_2 \Delta N - B_2 \Delta E$$
$$\vdots$$
$$M_n - \rho_n = M_n - A_n \Delta N - B_n \Delta E$$

It is noted that the position $\Delta N$ and $\Delta E$ in the above equations are the BEP location when $M_1 - \rho_1 = M_2 - \rho_2 = M_n - \rho_n$ It thus follows, that:

$$M_1 - \rho_1 = M_1 - A_1 \Delta N - B_1 \Delta E$$
$$M_1 - \rho_1 = M_2 - A_2 \Delta N - B_2 \Delta E$$
$$\vdots$$
$$M_1 - \rho_1 = M_n - A_n \Delta N - B_n \Delta E$$

If the above set of equations is written in matrix format, the following formation results:

$$\begin{bmatrix} M_1 - \rho_1 \\ M_1 - \rho_1 \\ M_1 - \rho_1 \end{bmatrix} = \begin{bmatrix} M_1 & -A_1 & -B_1 \\ M_2 & -A_2 & -B_2 \\ M_n & -A_3 & -B_3 \end{bmatrix} \begin{bmatrix} 1 \\ \Delta N \\ \Delta E \end{bmatrix}$$

Or, written another way, as performed in step S906:

$$\begin{bmatrix} 1 \\ \Delta N \\ \Delta E \end{bmatrix} = \begin{bmatrix} M_1 & -A_1 & -B_1 \\ M_2 & -A_2 & -B_2 \\ M_n & -A_3 & -B_3 \end{bmatrix}^{-1} \begin{bmatrix} M_1 - \rho_1 \\ M_1 - \rho_1 \\ M_1 - \rho_1 \end{bmatrix}$$

In step S908, the above matrix equation is solved for $\rho_1$, $\Delta N$ and $\Delta E$.

Next in step S910, $\Delta N$ and $\Delta E$ is substituted in the other equations to determine the pseudorange changes for all the other satellites. This can further be used to confirm that the $\Delta N$ and $\Delta E$ is the position where all the taps from different SVs line up.

Figure 10:
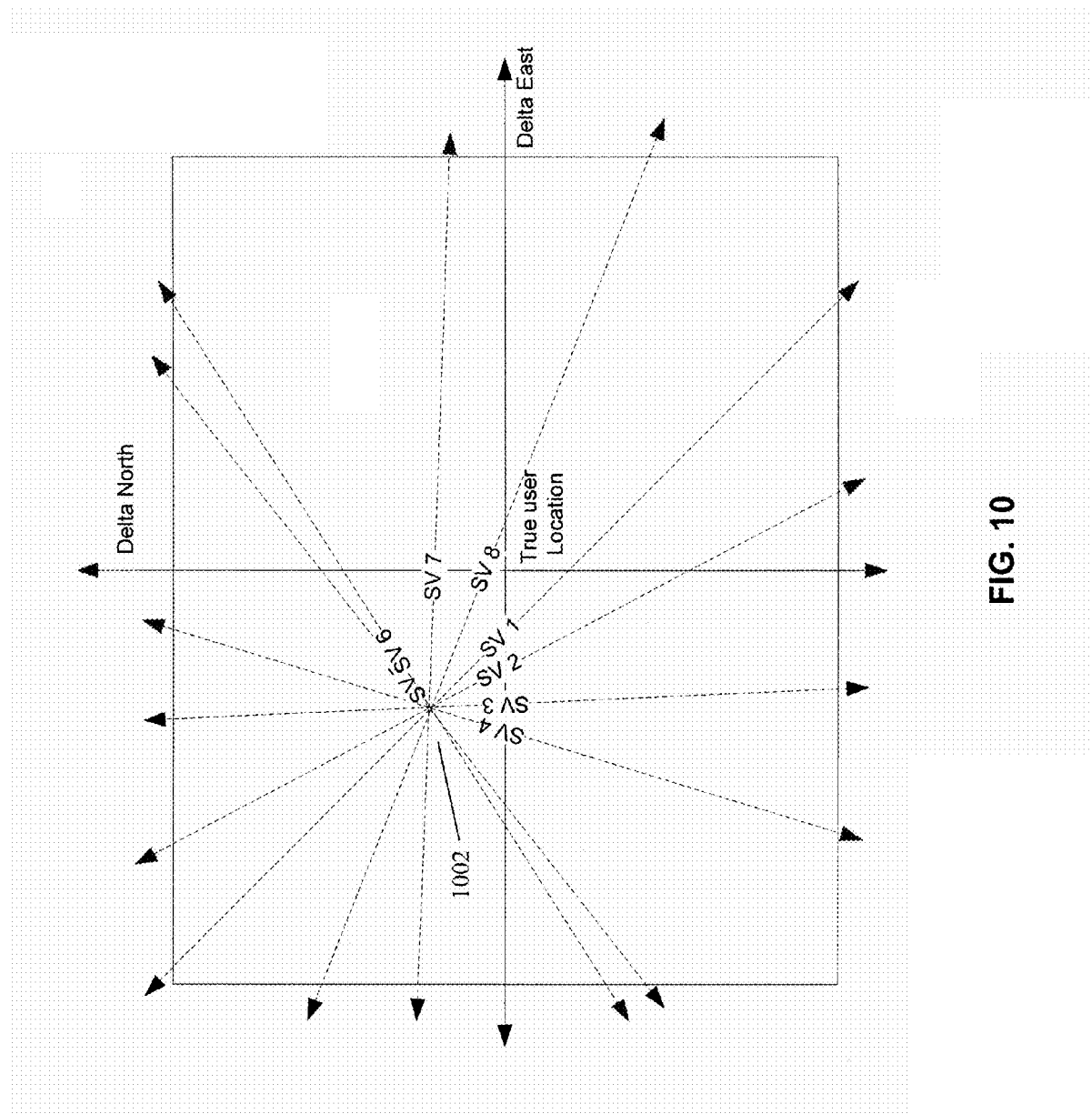
FIG. 10 is a diagram that graphically illustrates the method described in connection with FIG. 9.

FIG. 10 is a graph that helps explain how the SVs code phases are adjusted in the given position domain based on their azimuth and elevation at the specific delta north and delta east from the true position which is the center of the grid. The point of intersection 1002 of the SVs code phases corresponds to the initial position estimate. The distance between the center of the grid and the point of intersection of all the SVs is the delta position offset from the true position to the initial position estimate. Stated another way, if the initial estimated position was the true receiver position, then all of the acquired code phases would line up at a common tap of the code phase search range. Since the BEP position is not the true position, the peak code phases are at different taps of the search range. To discover the East-North offset between the initial position and the true position, the code phase tap numbers of each SV are independently adjusted by the above pseudorange adjustment formula until all the acquired code phases have moved to the same tap index at a common value of East-North position adjustment. Subtracting this East-North offset from the initial position provides an estimate of the true position.

In embodiments, the invention includes one or more intermediate steps to even further improve the performance of the composite weak acquisition before adjusting the code taps in the position domain.

One possible step is to convert any track measurements to acquisition reports so there are more SVs to perform composite weak acquisition. It is preferable to include real signal peak reports (i.e. the highest eight correlation peak values and their corresponding code taps) for cross satellite detection rather than just using a few unknown peak reports. The conversion of a track measurement to an acquisition report is done by propagating the code phase in a track command to the time of prepositon which is used to start all the acquisition channels. Propagating the code phase will ensure that all the reports across all the SVs are based on the common preposition time.

When all the possible SVs have acquisition reports available (SVs in acquisition or track state), the reports are sorted by signal power, highest to lowest.

Figure 11:
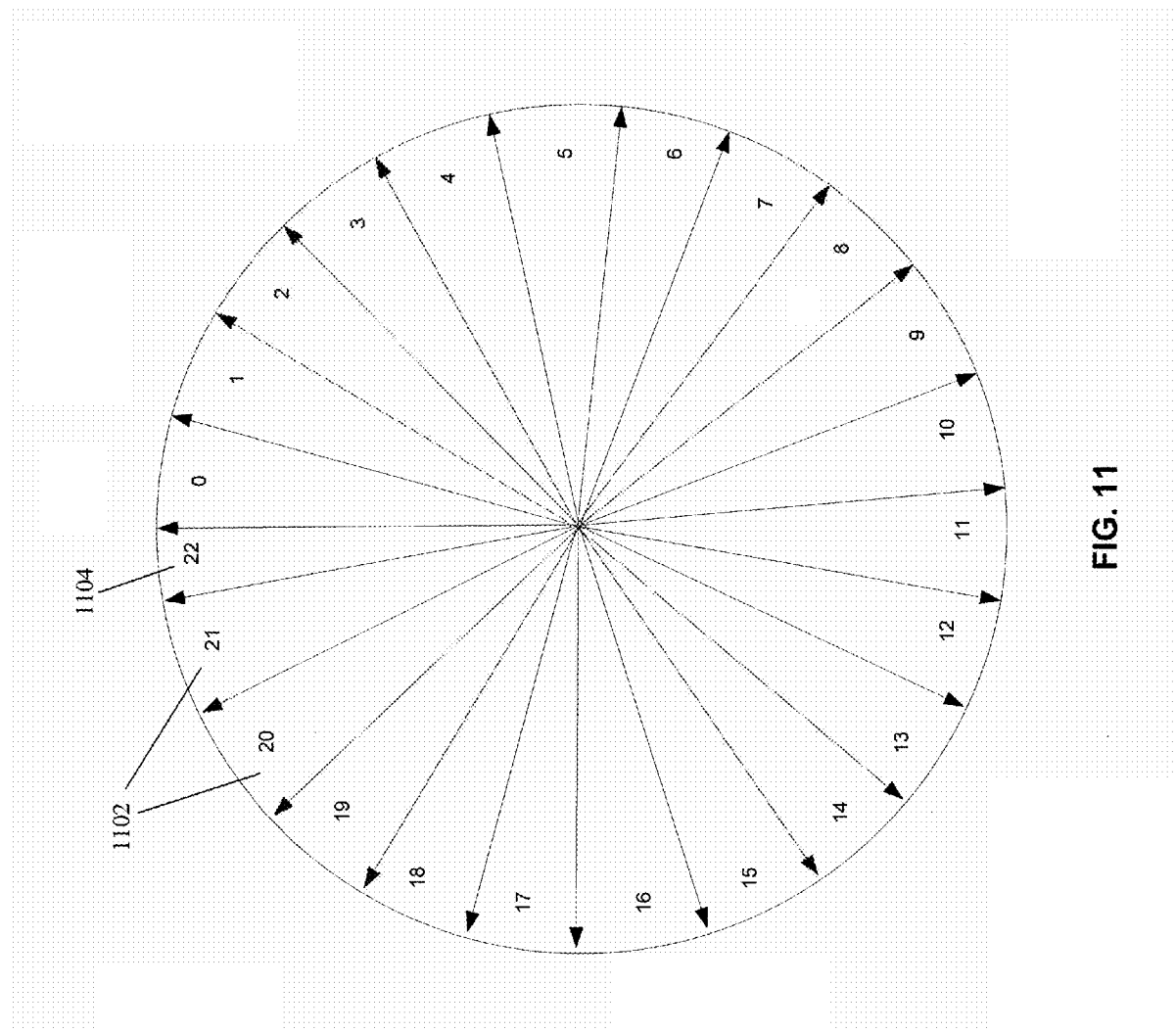
FIG. 11 is a diagram illustrating an example intermediate step of filtering SV's during weak composite acquisition according to embodiments of the invention.

In another possible intermediate step, the present inventors recognize that two satellites with close azimuths have a wider, less precise, point of intersection towards common code phases in the position domain, making the intersection diffuse over a wider area. To minimize the area of convergence of the different code phases, therefore, the azimuth plane is preferably divided into azimuth sectors of 16 degrees based on the satellites azimuth. So the whole plane is divided into 23 sectors, 22 equal sectors 1102 of 16 degrees, and the last 1104 being only 8 degrees as shown in FIG. 11.

So now at this point all the acquisition reports from multiple SVs are sorted and marked with their respective azimuth sectors. The determination of the adjustment to the code taps is done based on either of the methods described above.

Position domain search can be accomplished by either searching the entire grid by adjusting the $\Delta N$ and $\Delta E$, or by using the intersection of lines method. Searching the entire grid can be time consuming and throughput intensive, and the same result can typically be achieved using the point of intersection method with a fractional amount of resources. For the intersection of lines method, the SV's are already sorted by peak amplitude, and by choosing the top four SV's with good azimuth separation, a more precise point of intersection can be found with the least computational burden.

In this method, if there are two SVs present in the same azimuth sector 1102, only the strongest SV from that sector is considered and the other is omitted to minimize the diffusion of the code phases at the point of intersection.

Once composite weak acquisition is done using either position domain search or the intersection of lines method there are three different values, the tap value at which there was maximum power and the corresponding delta N and delta E values. The delta N and delta E values are used to compute the individual code corrections for each SV. The code corrections are then used to correct the code tap index from the acquisition report and to see if all the adjusted code taps now line up.

To minimize the probability of false alarm (pfa) of the composite weak acquisition, it is preferable that at least four SVs line up at the same code tap. If four or more line up then acquisition can be declared successful. The acquisition report from the peak that lines up can be used as code phase initialization to start each track directly.

For SVs that do not line up, this indicates that their acquisition reports were failures. But it is still possible to start tracks on those by using the highest amplitude tap from the alined SV's and using the code adjustment from the delta N and delta E, to determine the correct code tap for the non-aligned SV. Then the new code tap and frequency can be used to start a track.

Returning to FIG. 5, in step S512, by weak acquisition using any of the methods described above, the values of delta N and delta E have been obtained. As the actual corrections from the initial position estimate to the true position location, they are used to update the initial position to the true location. Once the initial position is updated to the true location, which is within ¼ chip resolution, the position uncertainty has been reduced to within <150 m. But a two second time uncertainty still remains.

Accordingly, in step S514, computing precise time/achieving frame synchronization is preferably performed following position domain search.

The time is accurately known after conventional frame sync is complete. However, the present inventors recognize that the same result can be achieved even without achieving conventional frame sync. This can be done assuming coarse aiding (ephemeris and time uncertainty of 2 sec), bit sync for one SV, and the user position is known to within <150 m, which are true after the composite signal and position estimation is accomplished, or after the Sync free nav is available for strong signals.

Once the user position is known to within <150 m, and using known satellite range rates, there remains a linear problem in time to solve. By adjusting the GPS time in 20 ms increments, the remaining position error can be reduced to near zero while simultaneously resolving the GPS time ambiguity. More particularly, by converting the track measurements to code tap offset and applying the range rates of the SV's to adjust the offsets using 20 ms time increments. The time at which the remaining small code tap offsets converge is equivalent to having frame sync.

Figure 12:
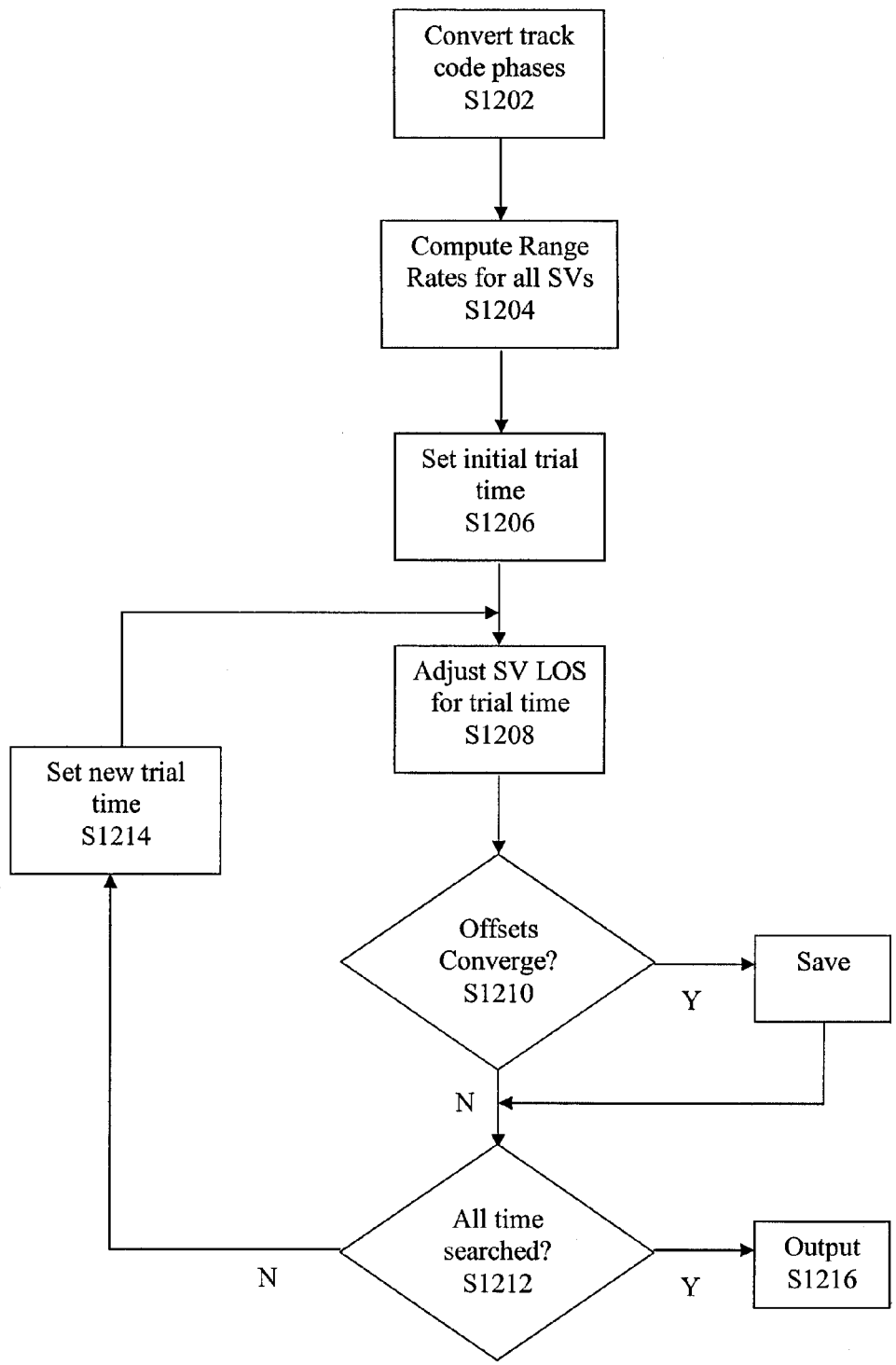
FIG. 12 is a flowchart illustrating an example method of obtaining precise GPS time/achieving frame sync using signals from multiple SVs in accordance with embodiments of the invention.

As shown in FIG. 12, after composite signal and position estimation, and knowing bit sync for at least one of the SV's, effectively all of the satellites are being tracked. Accordingly, in a first step S1202, the track code phases are converted to acquisition equivalent code taps. These tap values all correspond to a common initial estimate of GPS time, which is accurate to +/−two seconds. The objective of this algorithm is to remove the time offset and refine the position estimate. It is assumed that the satellite orbital path during the time uncertainty of +/−two seconds is approximately linear. In a next step S1204, the satellite range rates are computed from the ephemeris data. Almanac data can be used if it is sufficiently recent, e.g. less than a week old. These rates are computed at the initial GPS time estimate and are essentially constant over the time uncertainty interval. Next, in step S1206, the initial GPS trial time is set to the earliest GPS time in the time uncertainty interval. Also the initial Root Mean Square Error of the initial code tap offsets is set to an initial value, such as 300 m. Next, in step S1208, the line of sight satellite motion of each SV is accounted for by adjusting the code tap offset of each SV using the range rates determined in step S1204 and the current trial time. In a next step S1210, it is determined whether the code tap offsets for all SVs converge with less root mean square error than the prior best value. If less, the value will be saved to be the new minimum value and its corresponding time. In a next step S1212, it is determined if all time values have been searched. If not, in step S1214, the trial time is incremented by 20 ms and the process returns to step S1208. Otherwise, in step S1216, the time corresponding to the minimum root mean square error is output. The initial estimate of GPS time is adjusted by this trial time to obtain the true GPS time. As mentioned above, knowing the true GPS time is the equivalent to having frame sync.

According to certain aspects, using the present invention saves from 3 to 9 seconds to obtain frame sync in a strong signal environment where data collection can be achieved in a single pass. In weak signal conditions, conventional frame sync may not be achieved as data collection is not possible, whereas it can be achieved using the present invention.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   identifying, in a receiver, correlation peaks in a plurality of acquisition channels for a corresponding plurality of satellites;
   performing a position domain search, in the receiver, to determine a position in which ranges to all of the satellites converge using the identified correlation peaks; and
   adjusting, in the receiver, a code phase in the acquisition channels based on the determined position.

2. A method according to claim 1, wherein performing the position domain search includes:
   establishing grid locations around an estimated position; and
   searching the grid locations to determine the estimated position.

3. A method according to claim 2, wherein searching the grid locations includes:
   determining an offset corresponding to one of the grid locations;
   summing peak values in the acquisition channels in a code phase window corresponding to the offset; and
   identifying the one of the grid locations as the position in response to the sum of the peak values being a maximum.

4. A method according to claim 1, wherein performing the position domain search includes determining an intersection of lines corresponding to the ranges to all of the satellites.

5. A method according to claim 4, wherein determining the intersection of the lines includes:
   identifying taps corresponding to the identified correlation peaks in the acquisition channels;
   determining azimuth and elevation of each of the satellites;
   forming a set of equations using the identified taps and the determined azimuth and elevation as known values and the position as an unknown value; and
   solving the set of equations for the position.

6. A method according to claim 1, further comprising:
   identifying certain of the satellites that are close together in azimuth; and
   using data from the acquisition channels for a selected one of the identified satellites that are close together in azimuth when performing the position domain search.

7. A method according to claim 1, further comprising:
   solving for GPS time using data from the adjusted acquisition channels.

8. A method according to claim 7, wherein solving includes:
   identifying time trials in a range of time uncertainty;
   determining adjusted ranges to the satellites at the identified time trials;
   determining a root mean square error of code offsets using the adjusted ranges; and
   identifying one of the identified time trials having the lowest root mean square error.

9. A method according to claim 7, further comprising identifying bit sync for at least one of the plurality of satellites.

10. A method comprising:

identifying, in a receiver, correlation peaks in a plurality of acquisition channels for a corresponding plurality of satellites;

performing a position domain search, in the receiver, to determine a position in which ranges to all of the satellites converge using the identified correlation peaks; and adjusting, in the receiver, a code phase in the acquisition channels based on the determined position, wherein the position domain search is performed in response to one or more of bit synchronization for one of the satellites being achieved, time aiding being obtained within +/−two seconds, position aiding being obtained to +/−3 km, and frequency aiding being obtained within 0.2 ppm.

11. A method comprising:

identifying, in a receiver, correlation peaks in a plurality of acquisition channels for a corresponding plurality of satellites;

performing a position domain search, in the receiver, to determine a position in which ranges to all of the satellites converge;

adjusting, in the receiver, a code phase in the acquisition channels based on the determined position; and using a combination of acquisition and tracking channels for the satellites, wherein code phase measurements of all the acquisition channels are modified to reference a common local reference time.

12. A method according to claim 11, wherein bit synchronization is achieved using one of the acquisition channels that is a tracking channel.

13. A method according to claim 7, further comprising a finer grid search over position and time to resolve a receiver clock time bias to high precision.

14. A method according to claim 1, wherein each of the acquisition channels comprise a common number of code phase taps, and wherein the correlation peaks are identified at corresponding code phase taps.

15. A method according to claim 1, wherein each of the correlation peaks are formed from a correlation between signals from the satellites and C/A codes for the satellites.

16. A method according to claim 1, wherein performing the position domain search includes obtaining azimuth and elevation values for each of the plurality of satellites.

17. A method according to claim 16, wherein the azimuth and elevation values are obtained from GPS aiding data.

18. A method according to claim 2, further comprising obtaining the estimated position from GPS aiding data.

* * * * *